US012458552B2

(12) United States Patent
Aristide

(10) Patent No.: US 12,458,552 B2
(45) Date of Patent: Nov. 4, 2025

(54) HOSPITAL BED HEADBOARD

(71) Applicant: Guy Aristide, East Meadow, NY (US)

(72) Inventor: Guy Aristide, East Meadow, NY (US)

(*) Notice: Subject to any disclaimer, the term of this patent is extended or adjusted under 35 U.S.C. 154(b) by 0 days.

(21) Appl. No.: 18/416,394

(22) Filed: Jan. 18, 2024

(65) Prior Publication Data

US 2024/0148579 A1 May 9, 2024

Related U.S. Application Data

(63) Continuation of application No. 17/856,323, filed on Jul. 1, 2022, now Pat. No. 11,911,326, which is a continuation of application No. 17/140,038, filed on Jan. 1, 2021, now Pat. No. 11,406,547.

(51) Int. Cl.
*A61G 7/00* (2006.01)
*A61G 7/05* (2006.01)

(52) U.S. Cl.
CPC ......... *A61G 7/0506* (2013.01); *A61G 7/0503* (2013.01)

(58) Field of Classification Search
CPC .......... A61G 7/00; A61G 7/05; A61G 7/0506; A61G 7/0503; A47C 19/00; A47C 19/022
See application file for complete search history.

(56) References Cited

U.S. PATENT DOCUMENTS 1,347,271 A * 7/1920 Hartman ................ A47B 23/02 5/507.1
2,739,319 A * 3/1956 Keller .................... A47C 19/04 5/617
3,351,960 A * 11/1967 Burkholder .......... A47C 19/022 5/503.1
4,584,989 A 4/1986 Stith
4,724,555 A * 2/1988 Poehner ................... A61G 7/05 5/624
4,768,241 A * 9/1988 Beney ...................... A61G 7/05 5/503.1
5,117,521 A * 6/1992 Foster .................. A61G 12/008 5/503.1
5,279,010 A * 1/1994 Ferrand .................. A61G 7/052 5/624
5,344,169 A * 9/1994 Pryor ................... A61G 12/008 5/503.1
5,425,148 A * 6/1995 Ashcraft .................. A61G 7/05 5/507.1
5,715,548 A 2/1998 Weismiller et al.
(Continued)

FOREIGN PATENT DOCUMENTS

EP 2446872 A2 5/2012
WO 9705845 A1 2/1997

*Primary Examiner* — Fredrick C Conley
(74) *Attorney, Agent, or Firm* — Haley Guiliano LLP

(57) ABSTRACT

In one example, a hospital bed headboard is disclosed. The hospital bed headboard includes a planar multiple paneled headboard. The planar multiple paneled headboard may be attached or detached from a hospital bed frame. The hospital bed headboard includes a first panel positioned adjacent to a second panel. Each one of the first panel and the second panel is to open and to close an egress in the planar multiple paneled headboard. The hospital bed headboard may also include a third panel. The first, second and third panels may be disengaged (or installed) as a single unit from a mobile hospital bed headboard.

20 Claims, 6 Drawing Sheets

(56) References Cited

U.S. PATENT DOCUMENTS

| | | | | |
|---|---|---|---|---|
| 7,376,992 | B2 * | 5/2008 | Salt | A61G 1/04<br>5/503.1 |
| 8,739,322 | B2 * | 6/2014 | Hof | A61H 33/0087<br>4/488 |
| 11,406,547 | B2 | 8/2022 | Aristide | |
| 2006/0277683 | A1 | 12/2006 | Lamire et al. | |
| 2012/0102655 | A1 | 5/2012 | Zerhusen et al. | |
| 2022/0211563 | A1 | 7/2022 | Aristide | |
| 2022/0331179 | A1 | 10/2022 | Aristide | |

* cited by examiner

HOSPITAL BED HEADBOARD

CROSS-REFERENCE TO RELATED APPLICATIONS

This application is a continuation of U.S. patent application Ser. No. 17/856,323, filed Jul. 1, 2022 (now allowed), which is a continuation of U.S. patent application Ser. No. 17/140,038, filed Jan. 1, 2021, now U.S. Pat. No. 11,406,547, which is hereby incorporated by reference herein in their entireties.

BACKGROUND

In many hospitals, patients often need to be transported from one hospital unit to another. As an example, a patient may need to be transported between the patient's room and an MRI (magnetic resonance imaging) unit where the patient can undergo an MRI scan. Or the patent may need to be transported to or from the ICU (intensive care unit) or the ER (Emergency Room).

The patient may be transported while lying on a mobile hospital bed. Medical equipment for the patient may be attached to the mobile hospital bed. The equipment may include ventilators, IV poles with multiple drips, monitors, Foley catheters, oxygen tanks, etc. Along with such equipment, moving the patient from one unit to another can be a harrowing experience for medical staff. Patient transport is a dynamic event requiring knowledge, skill, equipment, and communication. Transporting patients in the hospital and especially in the ICU is cumbersome, timely, leads to higher staff usage and impede care delivery for non-transport patients.

Medical equipment can be unwieldy and often calls for multiple staff to hold the medical equipment and to guide the mobile hospital bed. Sometimes, as many as five staff members are needed to move the patient often under hurried conditions that can be unsafe. IV lines and intubation lines with vital medication can be pulled out. Medical staff can also get hurt (e.g., back spasm) trying to navigate a medical hospital bed and equipment that is cumbersome.

High usage of staff, time and all of the attached equipment allows for many opportunities for errors and for harm to occur. Many mobile hospital beds also have a single standard headboard that is stationary and extends between the bedposts. If quick access to the patient becomes necessary during patient transportation, the single standard headboard may be an obstacle and may be the difference between life and death.

SUMMARY OF THE INVENTION

In one example, a hospital bed headboard is disclosed. The hospital bed headboard may be planar and multiple paneled. In some examples, the hospital bed headboard may include a first panel positioned adjacent to a second panel. The first panel may open a right side of the hospital bed headboard and the second panel may open a left side of the hospital bed headboard to provide an egress area within the hospital bed headboard. In this manner, if an emergency occurs during transportation of a patient, immediate access to the patient from the headboard side of the mobile hospital bed is provided to address the patient's emergency condition.

Once the emergency is over, the first panel may close the right side of the hospital bed headboard and the second panel may close the left side of the hospital bed headboard to close the egress area, so that the hospital bed headboard becomes fixed akin to traditional headboards.

In some examples, the hospital bed headboard may include panel shelves or platforms or trays attached to the exterior of the first panel and the second panel. The panel shelves or platforms may be extended to support medical equipment such as a respirator, a ventilator, etc. In this manner, existing equipment and additional equipment can be transported in a compact and efficient manner while utilizing fewer medical staff to manage items during patient transportation. When not in use, the shelves or platforms may be collapsed and stowed away.

In other examples, the hospital bed headboard may include a fixed third panel to protect a patient's head. The third panel is itself positioned below the first panel and the second panel, the third panel extending from a left support to a right support. In one example, the hospital bed headboard may include retractable IV (intravenous) poles positioned within a support of the hospital bed headboard.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of its scope. The principles here are described and explained with additional specificity and detail through the use of the accompanying drawings.

DETAILED DESCRIPTION

Figure 1:
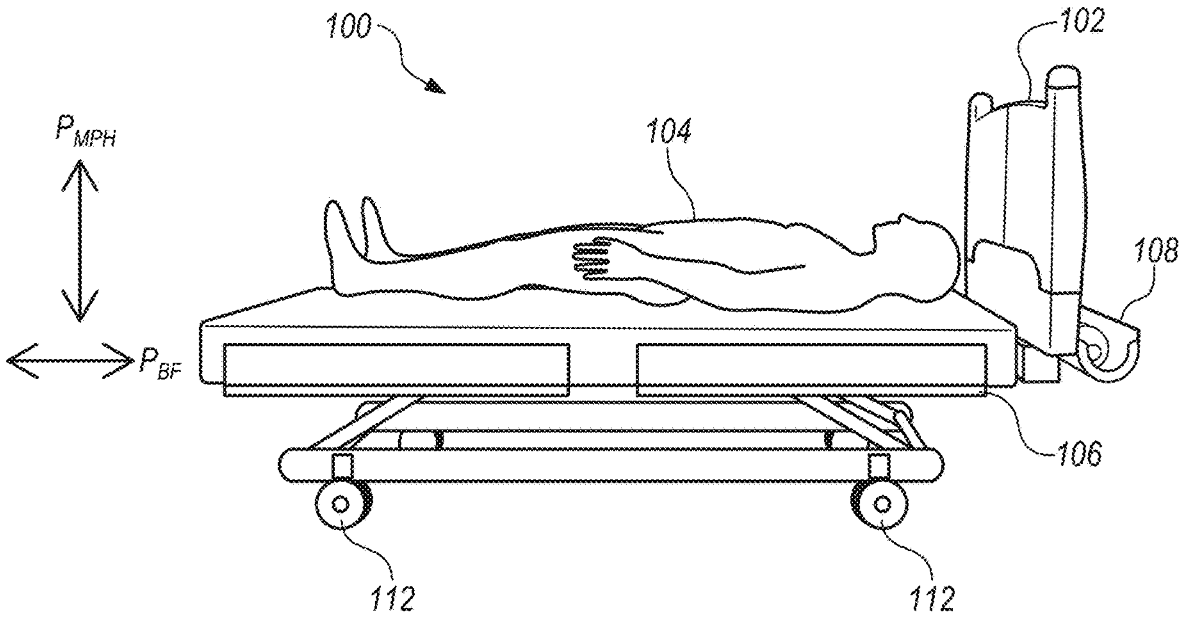
FIG. 1 illustrates a side plan view of a hospital bed headboard attached to a mobile hospital bed according to an example of the present invention.

FIG. 1 illustrates a side plan view of a hospital bed headboard 102 attached to a mobile hospital bed 100 according to an example of the present invention. In this example, mobile hospital bed 100 can facilitate the transportation of a patient 104 from one hospital unit to another unit such as when a medical procedure is needed by patient 104.

Here, the hospital bed headboard 102 may be planar and multipaneled. As such, in this disclosure, the hospital bed headboard 102 may be interchangeably referred to as planar multiple paneled headboard 102. As used herein, the term "planar" refers to a two-dimensional feature where a third dimension, if any, is insubstantial relative to other dimensions of the feature. By "multiple paneled," it is meant that hospital bed headboard 102 has plural distinct panels such as first panel 202A and second panel 202B that are not attached to each other. The first panel 202A may be positioned adjacent to the second panel 202B. (See FIG. 5 below for an illustration of the hospital bed headboard 102 by itself (without the mobile hospital bed 100)).

Figure 2:
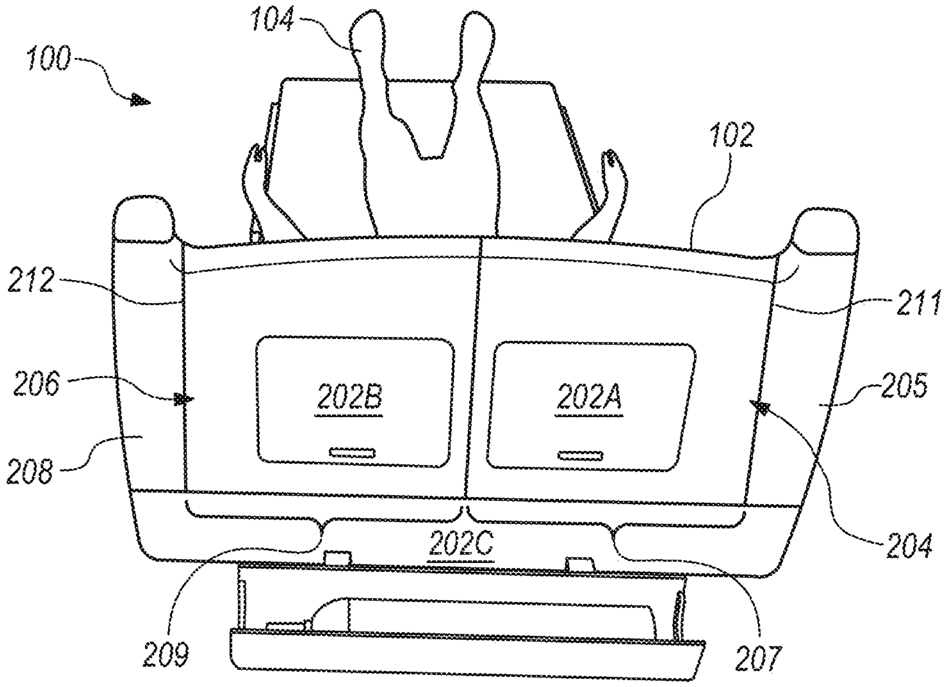
FIG. 2 illustrates a back perspective view of the mobile hospital bed and the hospital bed headboard of FIG. 1.

Referring now to FIG. 2, which is a back-perspective view of the mobile hospital bed 100 and hospital bed headboard 102 showing a distal end 204 of the first panel 202A. The distal end 204 may be pivotally attached at intersection 211 to a corresponding right end support 205. As used here, "pivotally attached" may include attachment devices such as butt hinges, pivot hinges, etc. In this manner, first panel 202A may open a right side 207 of the hospital bed headboard 102. Similarly, an oppositely disposed distal end 206 of the second panel 202B is pivotally attached at an intersection 212 to a left end support 208. In this manner, second panel 202B may open a left side 209 of the hospital bed headboard 102.

In short, the first panel 202A opens the right side 207 of the hospital bed headboard 102 and the second panel 202B opens the left side 209 of the hospital bed headboard 102 to provide an egress 302 (shown in FIG. 3) for the hospital bed headboard 102.

As such, if an emergency exists and quick access to the patient becomes necessary during patient transportation, first panel 202A and second panel 202B can be opened—inwardly toward patient 104 to immediately access patient 104 from the headboard end of mobile hospital bed 100. For example, during patient transportation, if patient 104 suddenly begins to choke, first and second panels 202A and 202B can be immediately opened to access patient 104 via egress 302 and to treat the choking condition thus saving the patient's life.

Once the headboard is open, it allows quick life-saving access to the patient's head. Clinicians may easily assess the patient's neurological and respiratory status quickly. When the emergency is over, the first panel 202 closes the right side 207 of the hospital bed headboard 102 and the second panel 202B closes the left side 209 of the hospital bed headboard 102 so as to close the entirety of the egress 302 in the hospital bed headboard 102. In one example, hospital bed headboard 102 may be akin to double doors that can be swung open and can then be closed to form a single headboard once the emergency is over.

Figure 3:
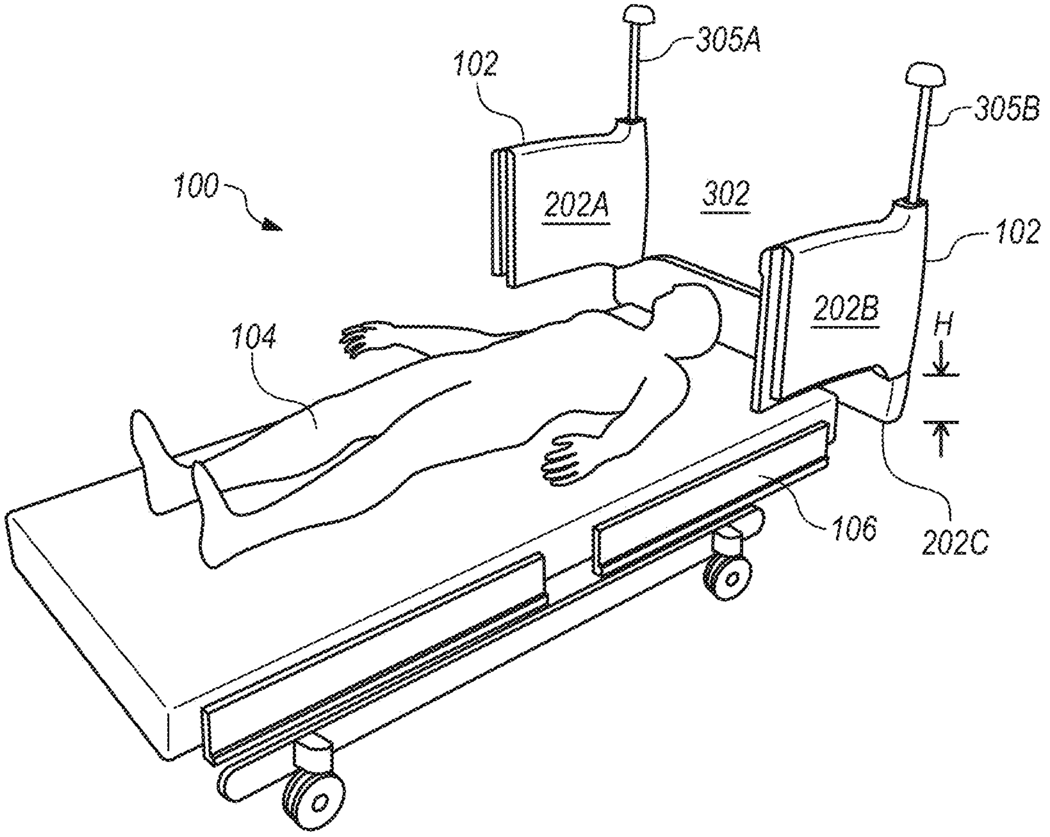
FIG. 3 illustrates a front perspective view of the mobile hospital bed with open front panels of the headboard according to an example of the present disclosure.

In FIG. 2, hospital bed headboard 102 may include a third panel 202C positioned below the first panel 202A and the second panel 202B. Third panel 202C may be fixed and may extend from the right end support 205 to the left end support 208 (or substantially from distal end 206 to the distal end 204). The third panel 202C can protect the head of patient 104 while lying on mobile hospital bed 100. As shown in the example of FIG. 3, the height H of third panel 202C is of sufficient height to extend from the bottom to the top of the head of patient 104 (while lying on mobile hospital bed 100) to prevent objects or hospital staff from making accidental contact with the head of patient 104.

In some examples, the hospital bed headboard 102 may be part of mobile hospital bed 100 at the time of manufacture. In other examples, the hospital bed headboard 102 may replace existing hospital bed headboards on a mobile hospital bed. In which case, once the existing headboard is disengaged, the hospital bed headboard 102 can be attached to the frame of the mobile hospital bed via screws or other attachment mechanisms.

Figure 6:
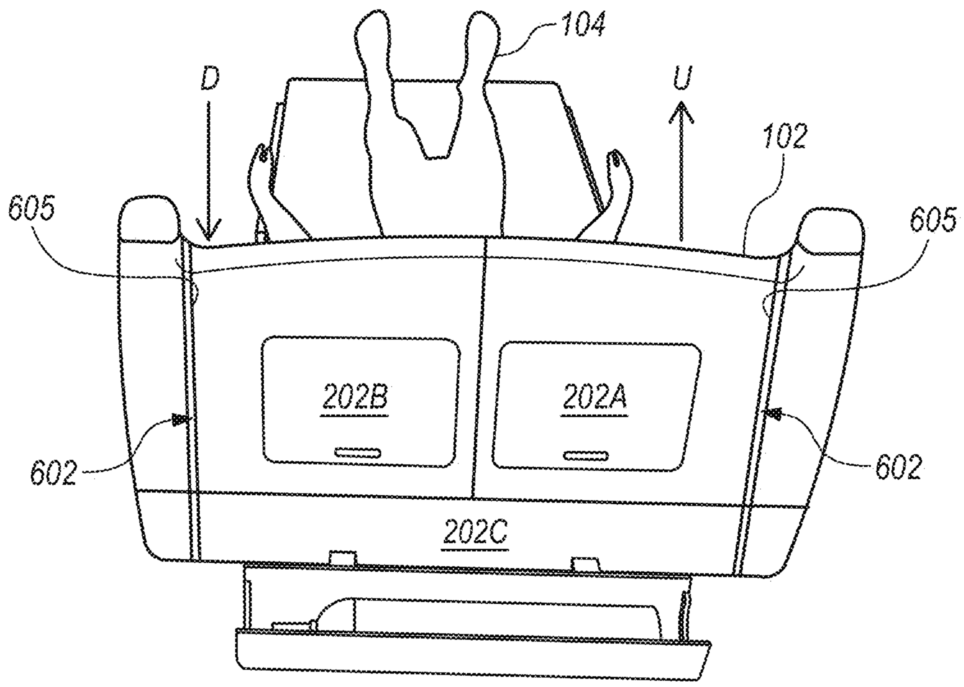
FIG. 6 illustrates a top back perspective view of the mobile hospital bed of FIG. 1 wherein the hospital bed headboard is insertable or removable in an example of the present disclosure.

In some examples, as shown in FIG. 6, first panel 202A, second panel 202B and third panel 202C are designed to insert into mobile hospital bed 100 as a single unit. The panels as a single unit may be inserted downward along a direction D to slide the panels along slot 602 until the entirety of the panels is engaged. Specifically, the first panel 202A and the second panel 202B may be pivotally or hingedly attached to a male end 605 and along with third panel 202C can slide into slot 602. Likewise, first panel 202A, second panel 202B and third panel 202C may be disengaged from the mobile hospital bed 100 as a single unit by sliding upwards in the U direction along slot 602.

In this manner, with the above examples, the hospital bed headboard 102 is adaptable and may be installed or disengaged from existing mobile hospital beds.

In one example, the width of hospital bed headboard 102 is 42" inches. In some examples, dimensions of hospital bed headboard 102 are compatible with all major bed manufacturers including Hillrom™ and Stryker™. Other suitable dimensions may be employed. Hospital bed headboard 102 may be constructed from a variety of suitable materials. For example, hospital bed headboard 102 may be made of a polymeric material. Other materials may be wood, metal or any material consistent with the spirit and scope of the present disclosure.

Referring now to FIG. 1, mobile hospital bed 100 further includes a bed frame 106 connected to the hospital bed headboard 102. A plane of the bed frame PBF extends latitudinally and is substantially perpendicular to a plane $P_{MPH}$ of the planar multiple paneled headboard that extends in a longitudinal direction. Mobile hospital bed 100 also includes an oxygen tank holder 108 and legs 110 attached to an underside of bed frame 106 to support the bed frame 106 and wheels 112 to attach to legs 110. The configuration of the frames and legs is but an example, and other configurations may be utilized. For example, legs 110 may be directly coupled from bed frame 106 to wheels 112.

Figure 4:
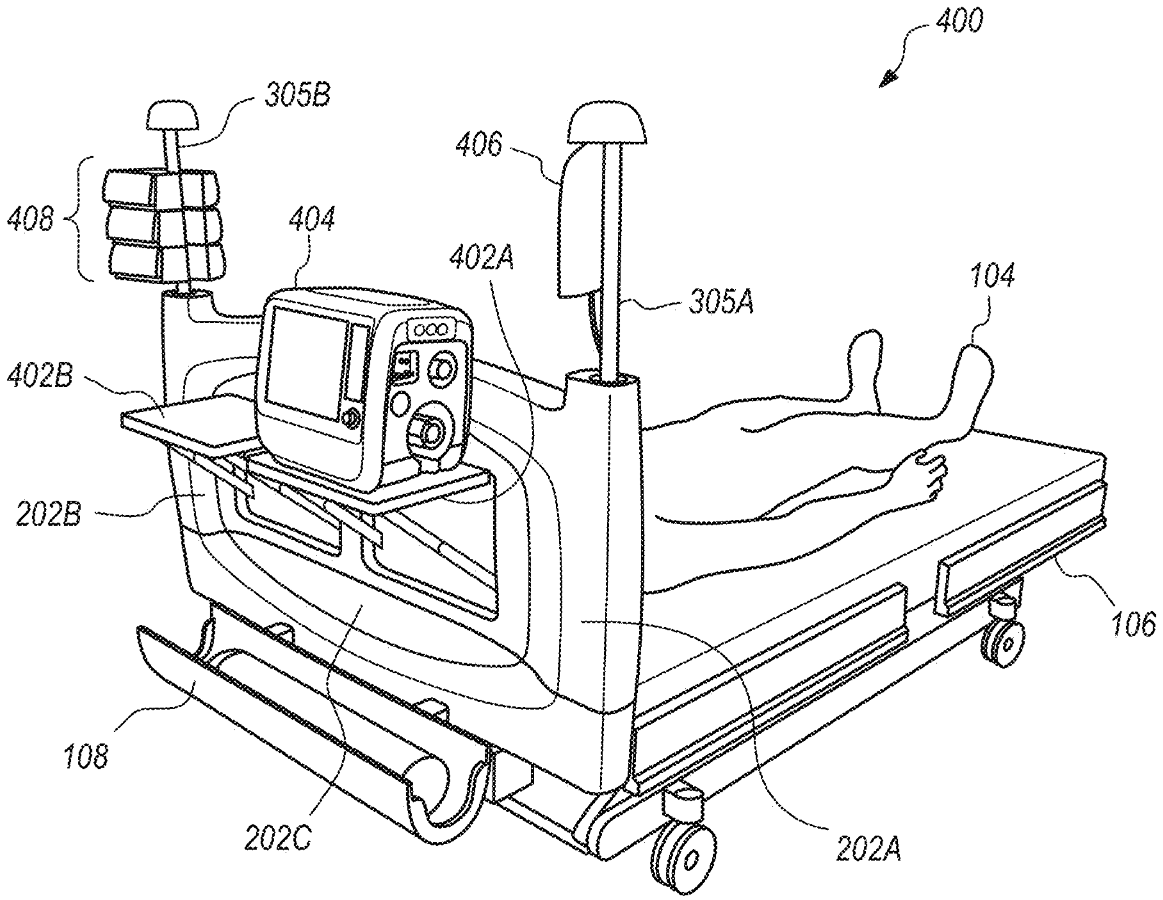
FIG. 4 is a right corner perspective view of a mobile hospital bed illustrating the panel shelves (platforms) of the headboard according to an example of the present disclosure.

FIG. 4 is a right corner perspective view of a mobile hospital bed 400 illustrating the panel shelves (platforms) of the hospital bed headboard 102 according to an example of the present disclosure. In this example, mobile hospital bed 400 includes plural panel shelves (platforms) including a first panel shelf or platform 402A and a second panel shelf or platform 402B.

Each one of the first panel shelf 402A and the second panel shelf 402B may support medical equipment used by or attached to patient 104. As can be seen in FIG. 4, second panel shelf 402B is supporting a ventilator 404. Although not shown, other types of medical equipment may be supported. By supporting medical equipment on shelves attached to the headboard, separate stands for medical equipment, which can be cumbersome, need not be employed. Moreover, existing equipment and additional equipment can be transported in a compact and efficient manner while utilizing fewer medical staff to manage items during patient transportation.

In FIG. 4, IV poles 305A and 305B are also shown. Each one of IV pole 305A and 305B is retractable as further illustrated in FIG. 5. In this example, IV pole 305A may hang an intravenous bag 406. In other examples, IV pole 305B may hold pumps 408 for delivering medication to patient 104 (FIG. 1). The items on the IV poles 305A and 305B may be held by anchors 512 (FIG. 5), which anchors 512 may be concealed by caps 514. In this manner, free standing poles that would ordinarily hold medical equipment separate and apart from medical hospital bed 100 are eliminated. Although not shown, IV poles 305A and 305B may hold other medical devices or equipment.

Figure 5:
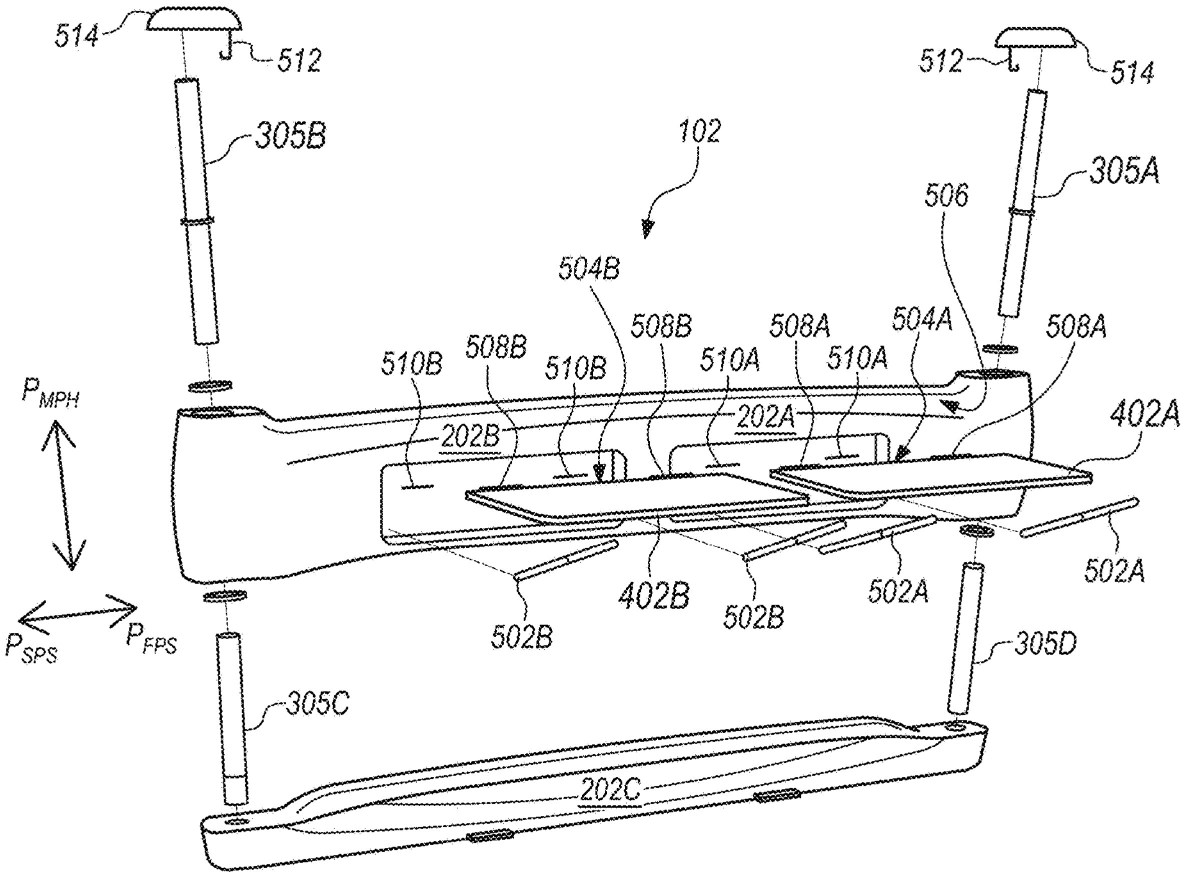
FIG. 5 illustrates an exploded view of the hospital bed headboard of FIG. 1 showing attachment of the first and second panel shelves according to an example of this disclosure.

FIG. 5 illustrates an exploded view of hospital bed headboard 102 showing attachment of the first and second panel shelves 402A and 402B. In one example, when first panel shelf 402A is extended to support medical equipment, a front edge 504A of the first panel shelf 402A is attached to an exterior side 506 of the first panel 202A.

Specifically, front edge 504A of first panel shelf 402A and the first panel 202A are attached via a male lip 508A that mates with a corresponding female opening 510A. Second panel shelf 402B and second panel 202B are also attached via a male lip 508B that mates with female opening 510B. It is noted that a plane $P_{FPS}$ of first panel shelf 402A is disposed latitudinally to the plane $P_{MPH}$ of hospital bed headboard 102. Similarly, plane PSPS of second panel shelve 402B is disposed latitudinally to the plane $P_{MPH}$ of hospital bed headboard 102.

In addition, when first panel shelf 402A is extended as in FIG. 5, a pair of brackets 502A can be extended to lock first panel shelf 402A in place while another pair of brackets 502B can be extended to lock second panel shelf 402B in place. Conveniently, when first panel shelf 402A and second panel shelf 402B are not in use, the pair of brackets 502A and 502B may be unlocked to collapse first and second panel shelves 402A and 402B and to stow first and second panel shelves 402A and 402B to be flush with planar multiple paneled headboard 102.

FIG. 5 also illustrates an exploded view of IV poles 305A and 305B. Each one of IV poles 305A and 305B is retractable. Specifically, IV pole 305A may retract in its entirety into a base IV pole 305D while IV pole 305B may retract in its entirety into base IV pole 305C.

While the above is a complete description of specific examples of the disclosure, additional examples are also possible. Thus, the above description should not be taken as limiting the scope of the disclosure which is defined by the appended claims along with their full scope of equivalents.

I claim:

1. A hospital bed comprising:

a headboard coupled to a head section of a bedframe via two distal supports, wherein the headboard comprises two separate panels that are pivotally attached to the distal supports; and a first platform and a second platform integrated into the headboard, wherein the integration allows the first platform and the second platform to be outwardly opened latitudinally to a plane of the headboard such that:

the opened first and the second platform each provide a surface for placing objects, wherein the surface is vertically located below the height of the headboard;

the surface for placing objects in on a side of the headboard that is facing away from the bedframe; and no portion of the surface protrudes on the side of the headboard that is facing inward towards the bedframe.

2. The hospital bed of claim 1, wherein the first platform includes a first end hinged to the headboard and a second unhinged end and the first platform is pivotable from the first end to be opened latitudinally to the plane of the headboard.

3. The hospital bed of claim 2, further comprising a locking mechanism to lock the first platform once the first platform pivoted latitudinally to the open position.

4. The hospital bed of claim 1, wherein the object to be placed on the surface of the first platform when the first platform is in its opened position is a medical device.

5. The hospital bed of claim 1, further comprising a retractable pole located within the supports, wherein the retractable pole is extendable and includes a cap at one end of the retractable pole.

6. The hospital bed of claim 5, wherein the retractable pole in its extended form allows hanging of an intravenous (IV) container for drug delivery to a patient.

7. The hospital bed of claim 6, further comprising, an anchor coupled to an end of the retractable pole that is farther from the headboard.

8. The hospital bed of claim 6, wherein the anchor is used for hanging the IV container.

9. The hospital bed of claim 6, wherein the retractable pole in its extended position is higher from the ground than the headboard.

10. The hospital bed of claim 1, wherein the retractable pole in its non-extended position is retracted within the headboard.

11. The hospital bed of claim 1, wherein the two separate panels include brackets for locking and unlocking.

12. The hospital bed of claim 11, wherein, in its locked position, the two separate panel are prevented from pivotally rotating about their respective distal support.

13. The hospital bed of claim 11, wherein, in their unlocked position, the two separate panels can be pivotally rotated about their respective distal support.

14. The hospital bed of claim 11, wherein the two separate panels in their unlocked position provide access to the head of the patient from the headboard without having to reach over the headboard.

15. The hospital bed of claim 11, wherein in the unlocked state, the two separate panels are collapsed and removed from the headboard.

16. The hospital bed of claim 1, further comprising a pair of hinges attached to the two separate panels for attaching the two separate panels to each other at an intersection.

17. The hospital bed of claim 1, wherein the pivotally attached two separate panels are opened inward towards a patient's head.

18. The hospital bed of claim 1, further comprising, a detaching mechanism to detach the pivotally attached two separate panels from the headboard.

19. The hospital bed of claim 1, wherein the pivotally attached two separate panels extend in a longitudinal direction.

20. The hospital bed of claim 1, further comprising a third panel, wherein the third panel is located below the two separate panels and the first, second, and third panels may be detached from the headboard as a single unit.

* * * * *